(12) United States Patent
Chipchase et al.

(10) Patent No.: US 7,674,536 B2
(45) Date of Patent: Mar. 9, 2010

(54) FUEL SUPPLY DEVICE AND FUEL SUPPLY SYSTEM

(75) Inventors: Jan Chipchase, Tokyo (JP); Nakade Shogo, Tokyo (JP)

(73) Assignee: Nokia Corporation, Espoo (FI)

( * ) Notice: Subject to any disclaimer, the term of this patent is extended or adjusted under 35 U.S.C. 154(b) by 1605 days.

(21) Appl. No.: 10/608,172

(22) Filed: Jun. 27, 2003

(65) Prior Publication Data

US 2004/0265671 A1   Dec. 30, 2004

(51) Int. Cl.
    *H01M 8/04* (2006.01)
(52) U.S. Cl. .................. 429/12; 429/13; 429/34; 429/22; 429/23
(58) Field of Classification Search .......... 429/12, 429/13, 34, 22, 23
    See application file for complete search history.

(56) References Cited

U.S. PATENT DOCUMENTS

| | | | |
|---|---|---|---|
| 5,932,365 A | 8/1999 | Lin et al. ............. | 429/12 |
| 6,326,097 B1 * | 12/2001 | Hockaday ............ | 429/34 |
| 2002/0106540 A1 | 8/2002 | Shioya ................. | 429/19 |
| 2003/0194589 A1 * | 10/2003 | Pratt et al. ............ | 429/22 |

FOREIGN PATENT DOCUMENTS

| | | |
|---|---|---|
| JP | 2003 007322 | 1/2003 |
| JP | 2003 123821 | 4/2003 |
| WO | WO 96/29751 | 9/1996 |
| WO | WO 02/061861 A1 | 8/2002 |

\* cited by examiner

*Primary Examiner*—Jane Rhee
(74) *Attorney, Agent, or Firm*—Harrington & Smith

(57) ABSTRACT

A refueling system for an electronic device, comprising a fuel reservoir in a fuel supply device; a fuel cell having a refillable fuel store in a mobile electronic device; a first fuel interface to the fuel supply device for releasable connection with a second fuel interface to the mobile electronic device; and a transfer mechanism for transferring fuel from the fuel reservoir across the first and second fuel interfaces, when connected, into the refillable fuel store.

20 Claims, 1 Drawing Sheet

FUEL SUPPLY DEVICE AND FUEL SUPPLY SYSTEM

TECHNICAL FIELD

Embodiments of the present invention relate to a fuel supply device for supplying fuel to a mobile electronic device.

BACKGROUND OF THE INVENTION

At present mobile electronic devices generally obtain their power from rechargeable battery cells. A mobile electronic device must therefore be periodically returned to a charger so that its rechargeable battery cell can be recharged. The charger requires a constant supply of electrical power. It is located near an electrical power outlet and connected to the electrical power outlet by an unsightly cable. The position in which the charger is located is therefore constrained by the location of electrical power outlets. It is additionally constrained, as one generally does not want unsightly cables to be on display in the reception areas of one's home.

Although users prefer to cluster their electronic device/phone with their wallet/purse and keys in a special location in the home, the required proximity to a nearby power source, means that the phone is often recharged away from this location.

It would be desirable to allow a user to leave their electronic device for recharging in a convenient location, such as the reception area of their home, along with their keys and wallet.

BRIEF SUMMARY OF THE INVENTION

According to one aspect of the present invention there is provided a fuel supply device for supplying fuel to a mobile electronic device comprising: a fuel reservoir; a fuel interface for connection with the mobile electronic device; and a transfer mechanism for transferring fuel from the reservoir to the interface and into the connected mobile electronic device.

According to another aspect of the present invention there is provided a mobile electronic device comprising: a fuel cell having a refillable fuel store; a fuel interface for connection with a fuel supply device; and a transfer mechanism for transferring fuel from the fuel interface and into the fuel store.

According to a further aspect of the present invention there is provided a refueling system for an electronic device, comprising: a fuel reservoir in a fuel supply device; a fuel cell having a refillable fuel store in a mobile electronic device; a first fuel interface to the fuel supply device for releasable connection with a second fuel interface to the mobile electronic device; and a transfer mechanism for transferring fuel from the fuel reservoir across the first and second fuel interfaces, when connected, into the refillable fuel store.

According to another aspect of the present invention there is provided a method of refueling an electronic device, comprising the steps of: connecting the electronic device to a fuel supply device; and automatically transferring fuel from a fuel reservoir in the fuel supply device to a refillable fuel store of a fuel cell in the mobile electronic device.

The fuel supply device may be independent and free-standing. Thus it can be placed in any convenient location, including the reception area of one's home. This allows a user of the mobile electronic device to leave it with their wallet and keys and still recharge the device.

BRIEF DESCRIPTION OF DRAWINGS

For a better understanding of the present invention reference will now be made by way of example only to the accompanying drawings in which.

DETAILED DESCRIPTION OF EMBODIMENT(S) OF THE INVENTION

Figure 1:
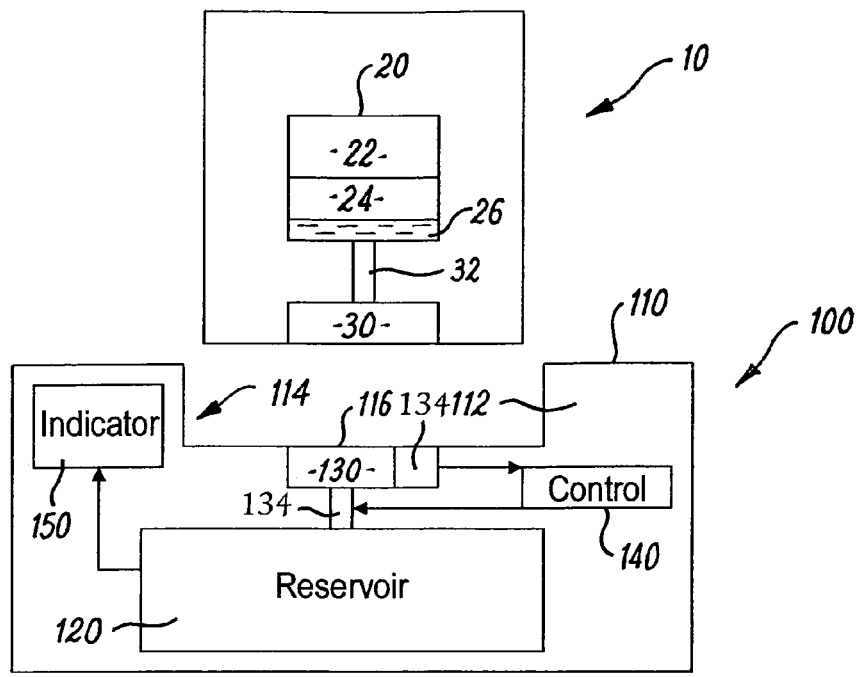
FIG. 1 illustrates a refueling system for a mobile handheld electronic device.

FIG. 1 illustrates a refueling system for a mobile handheld electronic device 10, The system includes the mobile handheld electronic device 10 and a fuel supply device 100 for supplying the electronic device 10 with fuel for storage. The fuel is material containing hydrogen.

The electronic device 10 comprises: a refillable fuel cell 20 having a electricity generating portion 22 and a fuel storage portion 24; a refueling interface 30 exposed or exposable at or near the base of the electronic device 10; a fuel transfer mechanism 32, for refilling the fuel storage portion 24 of the fuel cell 20, connected between the refueling interface 30 and the fuel storage portion 24 of the fuel cell 20.

The fuel storage portion 24 stores fuel 26. The fuel is a material containing hydrogen. It may be in any suitable form whether solid, liquid or gas. A current type of fuel uses a solution of methanol. However, the invention may be used with any current or future fuels.

The fuel storage portion 24 supplies fuel 26 to the electricity generating portion 22 of the fuel cell 20. The fuel cell 20 oxidises the fuel 26 to generate electron flow through an external electrical circuit (not shown).

Embodiments of the invention may be used with any type of fuel cell. Typically, the electricity generating portion 22 of a current fuel cell 20 has an anode, separated from a cathode by a proton exchange membrane (PEM). The anode is impregnated with a catalyst that breaks down fuel fed to the anode by the fuel storage portion 24, into carbon dioxide, protons and electrons. The protons pass through the electrolyte to the cathode. The electrons pass through an external electric circuit to the cathode. The cathode is impregnated with a catalyst that promotes the combination of oxygen, protons and electrons into water. The carbon dioxide produced is generally released to the air. The water produced may be re-used to dilute the fuel or allowed to evaporate into the air. If pure hydrogen is used as fuel, carbon dioxide is not generated.

The fuel storage portion 24 may be filled with fuel by a user, without removing it from the electronic device 10. In fact, it may be preferable for the fuel storage portion 24 to be integrated into the electronic device 10 such that is cannot be removed by a user.

The fuel supply device 100 is embodied in a stand-alone desktop stand 110 for the electronic device. The stand 110 has a body 112 that defines a cradle portion 114 for supporting a received electronic device 10. The cradle portion 114 has a base 116 that abuts the base of the electronic device 10 when the electronic device 10 is received in the cradle portion 114.

The fuel supply device 100 comprises: a large fuel reservoir 120; a refueling interface 130; a fuel transfer mechanism 132; a controller 140; and an indicator 150.

The large fuel reservoir 120 is capable of storing enough fuel to supply the electronic device 10 for a minimum convenient period i.e. 6 months or 1 year. The reservoir 120 may be a user refillable or embodied as a replaceable cartridge.

The refueling interface 130 is exposed or exposable at or near the base 116 of the cradle portion 114. It mates with the refueling interface 30 of the electronic device 10, when the base of the electronic device 10 abuts the base 116 of the cradle portion 114. The refueling interface 130 includes a detector 134 for detecting the mating of the interfaces 30, 130.

The fuel transfer mechanism 132 is connected between the refueling interface 130 and the fuel reservoir 120. It is used to refill the fuel cell 20 of the electronic device 10. The transfer mechanisms 32 and 132 may transfer the fuel by pressure.

The controller 140 is connected to the detector 134 and the fuel transfer mechanism 132. It controls the transfer of fuel from the fuel reservoir 120 to the electronic device 10 via the transfer mechanism 132. The transfer of fuel occurs automatically when the detector 132 detects the connection of the electronic device 10 and the stand 110.

The indicator 150 gives the user feedback as to how much fuel is in the reservoir 120.

Figure 2:
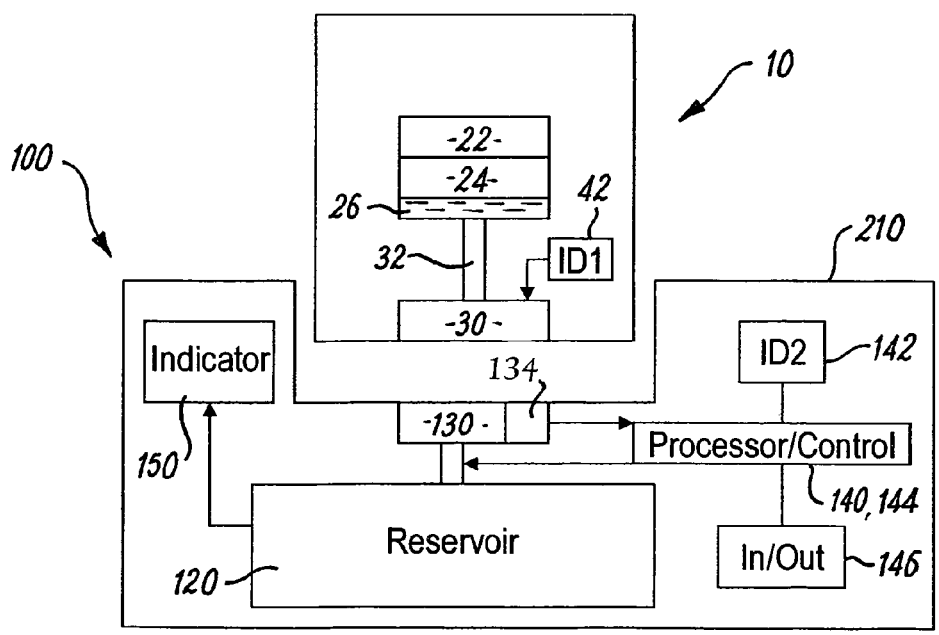
FIG. 2 illustrates an alternative refueling system for multiple mobile handheld electronic devices.

FIG. 2 illustrates an alternative embodiment. The fuel supply device 100 is embodied in a multi-user dispenser 210 that receives any one of a number of different electronic devices 10 for refueling. The electronic device 10 and fuel supply device 100 are similar to those described with reference to FIG. 1, and like reference numerals designate like features. However, the electronic device 10 and fuel supply device 100 comprise additional components and functionality.

The multi-user dispenser 210 is useful in environments where multiple people are likely to want to use a single fuel supply device. e.g. an office, a train station, etc The electronic device 10 additionally comprises: a memory 42 recording an identifier (ID1) of the electronic device 10.

The fuel supply device 100 additionally comprises: a memory 142 recording an identifier (ID2) of the fuel supply device 100 or its user; a processor 144 which may be integrated with controller 140; and an input/output interface 146

The refueling interfaces 30, 130 are additionally are in this example, additionally, data interfaces and allow the transfer of data between the electronic device 10 and the fuel supply device 100, when the refueling interfaces 30, 130 connect.

The processor 144 receives ID1 from the memory 42 of the electronic device 10 via its refueling interface 130 (or alternatively wirelessly using an RFID in the electronic device and a RF detector in the fuel supply device 100) and combines it with ID2 from its memory 142 in a request message. The processor 144 then sends the request message to a third party authenticator using the output interface 146. The output interface 146 may be, for example, a network adapter or a radio transceiver. The third party authenticator verifies that the mobile electronic device (or its user) has access rights to the fuel supply device 100 and settles payment for the fuel delivered by the supply device 100. The authenticator sends an authentication message authorizing the dispensing of fuel. The fuel supply device 100 receives this message via the input interface 146 and then enables the dispensing of fuel. The dispensation is metered so that only fuel that has been paid for is dispensed.

Where the electronic device 10 is a mobile cellular telephone, the fuel can be billed to the phone bill account and the phone can send the request message and receive the authentication message. Where this phone has no or insufficient power, the fuel supply 100 provides enough fuel to authenticate the transaction.

The ID1 may additionally identify the type to fuel to be supplied e.g. methanol, ethanol, etc Although embodiments of the present invention have been described in the preceding paragraphs with reference to various examples, it should be appreciated that modifications to the examples given can be made without departing from the spirit and scope of the invention.

The invention claimed is:

1. A fuel supply device comprising:
    a data interface configured to receive data from a mobile electronic device;
    a fuel reservoir configured to store fuel comprising hydrogen;
    a fuel interface configured to connect with the mobile electronic device; and
    a transfer mechanism configured to transfer fuel comprising hydrogen from the reservoir to the fuel interface and into a fuel storage portion of the connected mobile electronic device in dependence upon the data received from the mobile electronic device.

2. The fuel supply device according to claim 1, wherein the fuel supply device is configured to automatically transfer fuel comprising hydrogen to the mobile electronic device when the fuel interface connects with a corresponding fuel interface of the mobile electronic device.

3. The fuel supply device as claimed in claim 1, wherein the fuel reservoir is user-refillable.

4. The fuel supply device as claimed in claim 1, wherein the fuel reservoir is a user replaceable container.

5. The fuel supply device as claimed in claim 1, wherein the fuel comprising hydrogen is a liquid.

6. The fuel supply device as claimed in claim 1, wherein the data interface is comprised in the fuel interface.

7. The fuel supply device as claimed in claim 1, arranged for use with multiple different mobile electronic devices, wherein the data interface is configured to transfer an identifier between a mobile electronic device to which fuel is supplied and the fuel supply device.

8. The fuel supply device as claimed in claim 7, wherein the identifier is configured to identify the mobile electronic device to which fuel is supplied.

9. The fuel supply device as claimed in claim 7, wherein the identifier is configured to identify the type of fuel for supply to the mobile electronic device.

10. The fuel supply device as claimed in claim 7, further comprising a meter configured to control the amount of fuel dispensed.

11. The fuel supply device as claimed in claim 1, embodied in a supporting stand for the mobile electronic device, wherein the supporting stand comprises a cradle for receiving the mobile electronic device.

12. The fuel supply device as claimed in claim 11 further comprising a detector configured to detect when the cradle receives a mobile electronic device; and a controller, responsive to the detector, configured to enable transfer of fuel from the fuel reservoir to the mobile electronic device.

13. The fuel supply device as claimed in claim 1, wherein the data interface is a wireless interface.

14. The fuel supply device, as claimed in claim 8, wherein the identifier is configured to authenticate the mobile electronic device.

15. The fuel supply device as claimed in claim 8, wherein the identifier is configured to charge for transferred fuel to an account.

16. The fuel supply device as claimed in claim 15, wherein the account is a cellular phone bill account.

17. A fuel supply device comprising:

a data interface configured to receive data from a mobile electronic device;

a fuel reservoir configured to store fuel comprising hydrogen;

a fuel interface configured to connect with the mobile electronic device;

a transfer mechanism configured to transfer fuel comprising hydrogen from the reservoir to the fuel interface and into a fuel storage portion of the connected mobile electronic device in dependence upon the data received from the mobile electronic device; and an input/output interface configured to transmit the data to an authenticator, and to receive an authorization to dispense the fuel into the fuel storage portion of the connected mobile electronic device.

18. The fuel supply device as claimed in claim 17, further comprising a meter configured to control the amount of fuel dispensed.

19. The fuel supply device as claimed in claim 17, wherein the data is configured to charge for transferred fuel to an account.

20. The fuel supply device as claimed in claim 19, wherein the account is a phone bill account.

* * * * *